Dec. 10, 1957     O. PROBST     2,816,143
PROCESS FOR PURIFYING KETENE
Filed Jan. 15, 1954
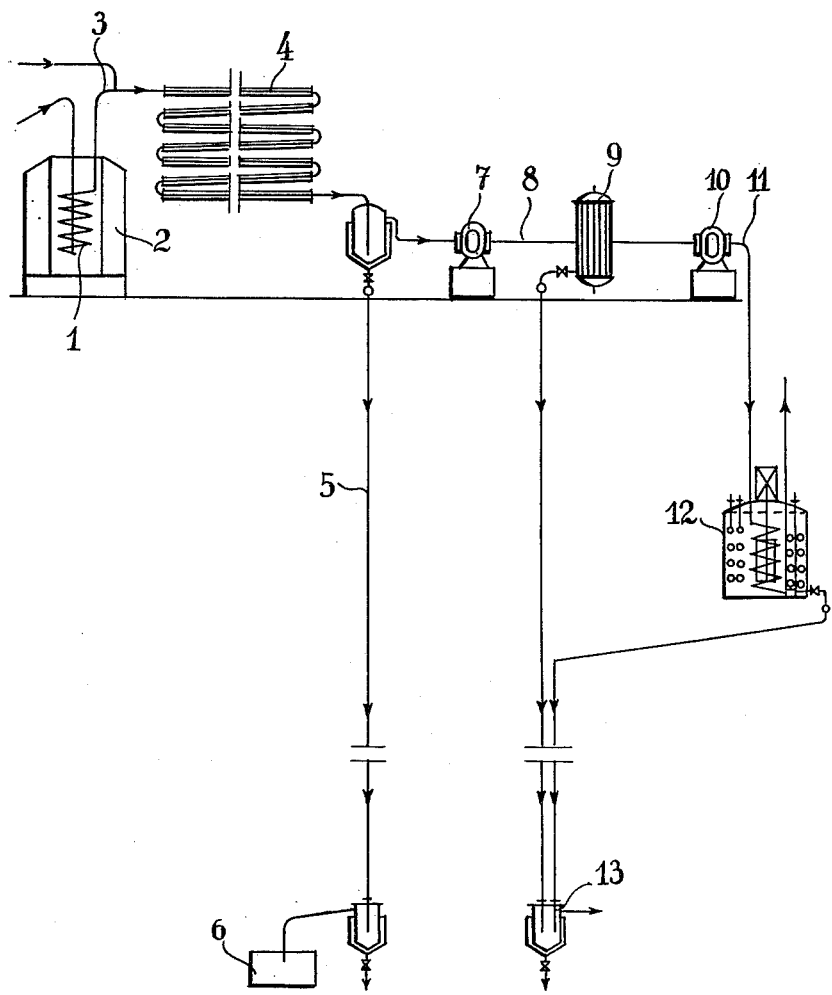
Otto Probst
INVENTOR
BY Richardson, David and Nodon
his ATTORNEYS United States Patent Office 2,816,143
Patented Dec. 10, 1957

2,816,143
PROCESS FOR PURIFYING KETENE

Otto Probst, Frankfurt (Main), Germany, assignor to Farbwerke Hoechst Aktiengesellschaft vormals Meister Lucius & Bruning, Frankfurt (Main)-Hochst, Germany, a company of Germany Application January 15, 1954, Serial No. 404,183

Claims priority, application Germany January 24, 1953

3 Claims. (Cl. 260—585.5)

The present invention relates to a process for purifying ketene.

It is known that acetic acid can be decomposed into ketene and water by a thermal treatment at 700° C.–800° C. in the presence of a catalyst, for example phosphoric acid esters. Advantageously a pressure between about 100 and about 200 millimeters of mercury is applied. After the reaction gases have left the reaction zone, they are introduced at a high speed (about 200 meters per second) into a cooling system, in order to retain by intense cooling the proportions of the products corresponding to the equilibrium attained in the reaction chamber. The water separates in the liquid state together with unreacted or re-formed acetic acid in the form of dilute acetic acid of about 30–40 percent strength. Due to the reduced pressure, however, part of the water and of the acetic acid remains in the vapor phase and is carried along by the ketene and during the passage of the ketene it is converted into acetic acid by an inverted decomposition process. Furthermore, acetic anhydride may be formed by the reaction of ketene and acetic acid.

When the ketent is intended for use for the manufacture of acetic anhydride, a small loss of ketene due to the formation of acetic acid or acetic anhydride is of no importance. When, however, the ketene is intended for use as starting material for other processes, it is necessary that it be obtained in the purest possible form. When, for example, not quite pure ketene, which can very well be used for the manufacture of acetic anhydride, is used for conversion into diketene by dimerization, the diketene obtained contains about 10–20 percent of acetic anhydride. In view of the low stability of diketene, it is very uneconomical to separate diketene from acetic anhydride by fractional distillation, and it is therefore much more advantageous to use pure ketene as starting material.

In order to effect the exhaustive separation of water or acetic acid or acetic anhydride from ketene, it has also been proposed gradually to cool the gases, obtained by the thermal decomposition of acetic acid, to about —70° C., operating under a reduced pressure identical with that applied also during the decomposition process. Besides the high costs of deep freezing, this procedure also involves the disadvantage that in some cases the condensates are cooled to temperatures considerably below the respective solidification points. Crystallization may thus occur and the passage of the ketene may be impeded. Complicated apparatus are required to overcome clogging, for example by the use of exchangeable deep freezing systems or by resorting to the addition of substances like acetic anhydride. Satisfactory operation in this manner on an industrial scale is, therefore, impossible.

The present invention is based on the observation that a ketene which is nearly free from water, acetic acid and acetic anhydride can be obtained in a simple manner by proceeding as follows:

After the thermal decomposition of acetic acid at temperatures between about 700° C. and about 750° C., preferably at about 725° C., the reaction mixture is worked up first under a pressure between about 50 and about 550 millimeters of mercury, preferably under a pressure of about 100 millimeters of mercury, with the initial separation of about 80 to about 97 percent, i. e. the major part, of the water and the acetic acid present in the reaction mixture in the usual manner by cooling within the said low-pressure region, the ketene being then further purified by cooling the remaining gases at about 0° C. to about —10° C. under a pressure between about 600 and about 2000 millimeters of mercury, preferably a pressure of about 760 millimeters of mercury, and the liquid constituents being again separated.

The ketene so obtained is nearly free from water, acetic acid and acetic anhydride.

The pressures indicated above may easily be produced by the adjustment of the suction and the delivery sides of a vacuum pump.

The purification may be carried out as follows: After the thermal decomposition has been carried out as usual, the reaction gases leaving the reaction furnace at a temperature of 700° C. to 800° C. are passed under a pressure between about 50 and about 550 millimeters of mercury through a cooling system using as cooling media first fresh water at about 0° C. to about +20° C. and then brine at about —10° C. The condensates consisting of water and acetic acid are separated together in the form of aqueous acetic acid and are then introduced by pressure gradient into a collecting basin which is under normal pressure.

The gaseous mixture of ketene with the remainder of the water and acetic acid and a small quantity of acetic anhydride flows to the suction side of the vacuum pumps. It passes through the vacuum pumps and is separated from the accompanying substances on the delivery side of the pumps by cooling to about 0° C. to about —10° C. Rotary compressors used as vacuum pumps, are, for example, suitable for this purpose. In order to control the heat of compression, the ketene is advantageously passed through 2 or 3 pressure stages, while cooling. The water or acetic acid or acetic anhydride still carried along with the ketene can than be condensed almost completely at the above mentioned temperatures under a pressure between about 600 and about 2000 millimeters of mercury, preferably, however, under atmospheric pressure. In none of the condensers of the cooling system does the temperature drop below the solidification points of the condensates to be separated and undisturbed working is ensured.

The ketene obtained by the process of the invention is especially suitable for the manufacture of diketene. If desired, it may be dissolved by diketene flowing in countercurrent and may then be further processed. From the ketene so purified, a colorless diketene can easily be obtained in a concentration of 98–100 percent strength, after a small residue has been separated in a film evaporator.

An apparatus suitable for use in carrying out the process of this invention is illustrated diagrammatically in the accompanying drawing.

Referring to the drawing, the thermal decomposition of acetic acid is effected in a reaction coil 1, made of a silicon-chromium-aluminum alloy, within a reaction furnace 2. In the course of 24 hours 1530 kilograms of acetic acid are evaporated into the reaction coil. Before the evaporated acetic acid enters the reaction coil, triethyl phosphate in vapor form is added as a catalyst at the rate of about 2.7 kilograms in 24 hours. At the outlet 3 of the coil, the reaction gases have a temperature of 730° C. and a pressure of 100 millimeters of mercury. In order to stabilize the equilibrium proportions, a small amount of ammonia is introduced at the outlet from the furnace. About 663 kilograms of an aqueous solution of acetic acid of 35 percent strength are condensed in a Liebig condenser 4 which has an area of about 6.5 m.² and which is first cooled with fresh water at about 0° C. to about +20° C. and then with a cooling brine at −10° C. The condensates are introduced by pressure gradient 5 into a collecting basin 6. The remaining gaseous constituents are led under a pressure of about 90 millimeters of mercury to the suction side of a rotary compressor 7. The pressure on the delivery side 8 of the compressor is about 620 millimeters of mercury. The heat of compression is eliminated by cooling the compressor and by further cooling in an alternate cooler 9. The gas enters another cooled rotary compressor 10 and leaves it at the delivery side 11 under atmospheric or superatmospheric pressure. The speed of the compressor necessary for producing the required low pressure is adjusted by a variable gear. Under atmospheric pressure the crude ketene then passes through a cooler 12 which is kept at about −10° C. In a separator 13, 75 kilograms of a mixture of acetic acid and acetic anhydride containing a small percentage of diketene are separated.

732 kilograms of ketene are obtained from which an equal amount of diketene can be obtained by dimerization.

I claim:

1. In the process for preparing purified ketene wherein acetic acid is thermally decomposed under reduced pressure to form a gaseous mixture, and the gaseous mixture is cooled at a temperature of at most about +20° C. but above the temperature at which components of said mixture crystallize and at a pressure between about 50 and about 550 mm. of mercury, the improvement which comprises thereafter subjecting said gas to a pressure of about 600 to about 2000 mm. of mercury at a temperature below about 0° C. and above the temperature at which components of said mixture crystallize, whereby impurities in said mixture are condensed to leave a substantially pure gaseous ketene.

2. In the process for preparing purified ketene wherein acetic acid is thermally decomposed under reduced pressure to form a gaseous mixture, and the gaseous mixture is cooled at a temperature of at most about +20° C. but above the temperature at which components of said mixture crystallize and at a pressure between about 50 and about 550 mm. of mercury, the improvement which comprises thereafter subjecting said gas to a pressure of about 760 to about 2000 mm. of mercury at a temperature below about 0° C. and above the temperature at which components of said mixture crystallize, whereby impurities in said mixture are condensed to leave a substantially pure gaseous ketene.

3. In the process for preparing purified ketene wherein acetic acid is thermally decomposed under reduced pressure to form a gaseous mixture, and the gaseous mixture is cooled at a temperature of at most about +20° C. but above the temperature at which components of said mixture crystallize and at a pressure between about 50 and about 550 mm. of mercury, the improvement which comprises thereafter subjecting said gas to a pressure of about 600 to about 2000 mm. of mercury at a temperature between about 0° C. and about −10° C. whereby impurities in said mixture are condensed to leave a substantially pure gaseous ketene.

References Cited in the file of this patent

UNITED STATES PATENTS

| | | |
|---|---|---|
| 1,879,497 | Rice | Sept. 27, 1932 |
| 2,108,829 | Sixt et al. | Feb. 22, 1938 |
| 2,514,294 | Rupp | July 4, 1950 |
| 2,666,019 | Winn | Jan. 12, 1954 |
| 2,688,640 | Schnegg | Sept. 7, 1954 |

OTHER REFERENCES

Serial No. 404,666, Popp et al. (A. P. C.), published April 20, 1943.